J. O. THOMPSON.
MANURE SPREADER.
APPLICATION FILED OCT. 3, 1913.
1,101,358.
Patented June 23, 1914.
2 SHEETS—SHEET 1.
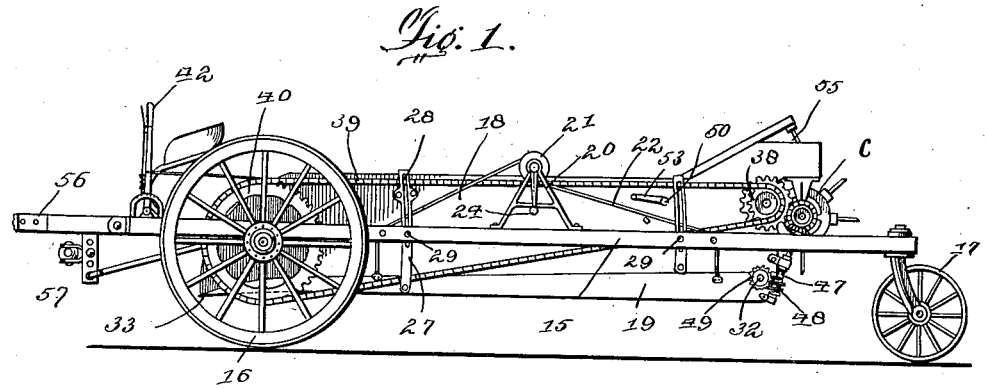
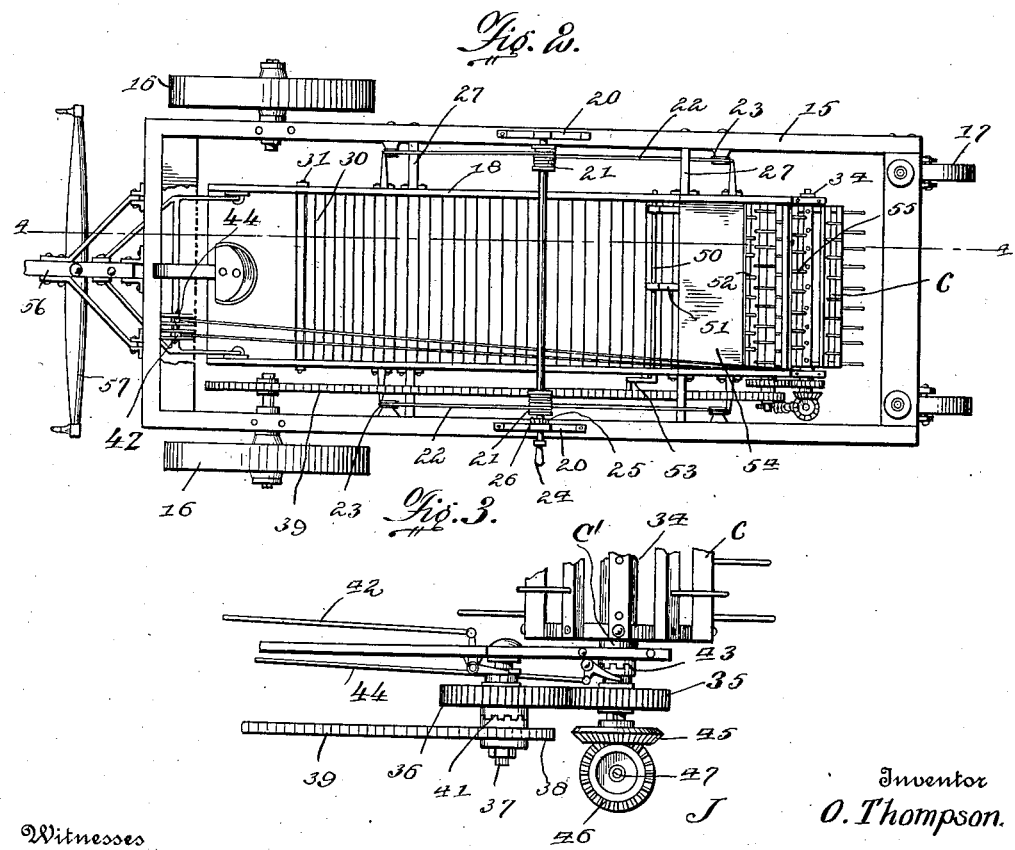
Witnesses
Frederick L. Foe,
J. W. Bagger
Inventor
O. Thompson.
By Victor J. Evans.
Attorney

UNITED STATES PATENT OFFICE.

JOSEPH O. THOMPSON, OF GUILFORD, MISSOURI.

MANURE-SPREADER.

1,101,358.	Specification of Letters Patent.	Patented June 23, 1914.

Application filed October 3, 1913. Serial No. 793,236.

*To all whom it may concern:*

Be it known that I, JOSEPH O. THOMPSON, a citizen of the United States, residing at Guilford, in the county of Nodaway and State of Missouri, have invented new and useful Improvements in Manure-Spreaders, of which the following is a specification.

This invention relates to manure spreaders or distributers of that class in which a receptacle mounted on transporting wheels is provided with an endless conveyer arranged longitudinally adjacent to the bottom for the purpose of supporting the load and of conveying the load in the direction of the distributing cylinder supported for rotation at the tail end of the receptacle.

The present invention has for its object to produce a device of this class which may be described as "self loading," the receptacle being in the nature of a scraper which may be lowered to a ground engaging position for the purpose of gathering the manure from the surface of the ground in the lot where it has been permitted to accumulate.

A further object of the invention is to produce a device of simple and improved construction wherein the receptacle, constituting a scraper, may be conveniently raised or lowered with respect to a wheel supported carrying frame, the receptacle being provided with an endless conveyer and with a rotary distributing cylinder; means being also provided for transmitting motion from one of the transporting wheels to the distributing cylinder and to the conveyer and for interrupting the motion of the cylinder while manure is being gathered and also for interrupting the motion of the conveyer as well as the cylinder while the load is being transported to the field where it is to be distributed.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details theren exhibited, but that changes, alterations and modifications within the scope of the claims may be resorted to when desired.

Figure 4:
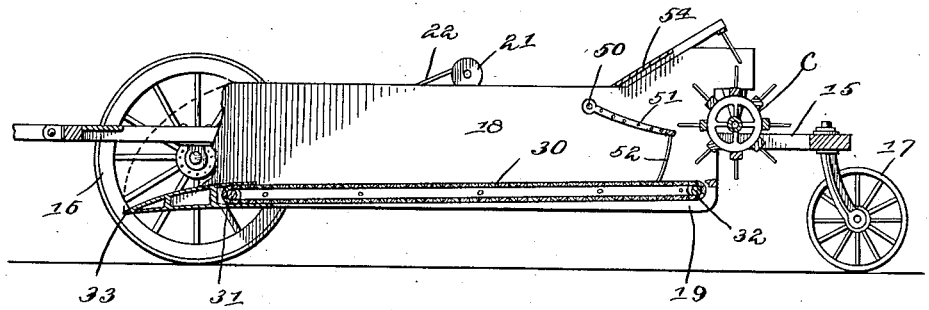
Figure 5:
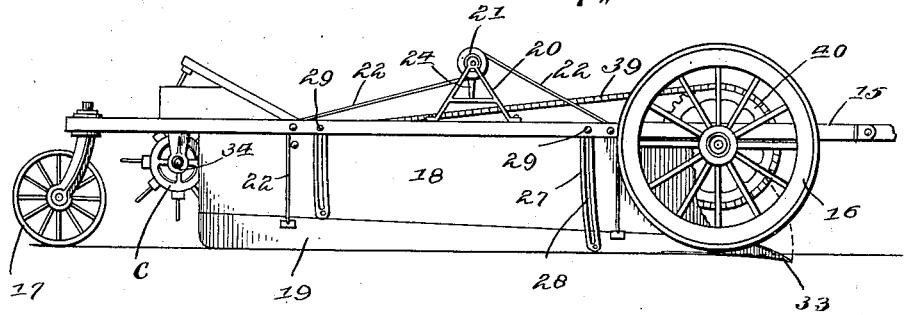
Figure 6:
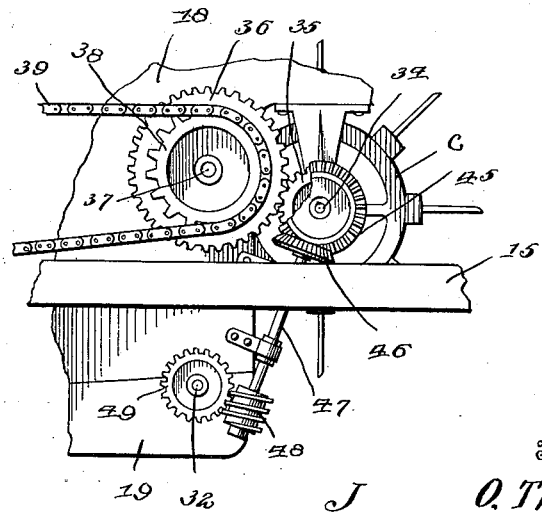

In the drawings, Figure 1 is a side elevation of a machine constructed in accordance with the invention. Fig. 2 is a top plan view of the same. Fig. 3 is a detail plan view, enlarged, of a portion of the machine including the clutch devices. Fig. 4 is a longitudinal sectional view taken on the line 4—4 in Fig. 2. Fig. 5 is a side elevation showing the side opposite to that seen in Fig. 1 and showing the scraper or receptacle lowered to load receiving position. Fig. 6 is a detail side elevation, enlarged, of the rear part of the machine.

Corresponding parts in the several figures are denoted by like characters of reference.

A frame 15 of substantially rectangular shape is provided near the front end thereof with ground engaging transporting wheels 16, the rear end of the frame being supported on caster wheels 17. A box-like receptacle 18 is provided, said receptacle having sills or runners 19 arranged under the bottom adjacent to the side edges thereof. The frame 15 supports brackets 20 whereon a drum 21 is mounted for rotation. The receptacle 18 is movably supported by means of flexible elements 22, each of which is connected at one end with the receptacle and at the other end with the drum, said flexible elements being guided over pulleys 23 on the frame. The drum 21 has a crank 24, whereby it may be rotated, and said drum is also provided with a ratchet 25 engaged by a pawl or dog 26 to prevent reverse rotation, thus enabling the receptacle to be supported at various elevations. The receptacle is also provided with guides 27 having slots 28 engaging guide pins 29 on the frame for the purpose of preventing the said receptacle from swinging or moving longitudinally of the frame structure.

The bottom of the receptacle 15 is formed by an endless conveyer 30 which is guided over shafts 31, 32 near the front and rear ends, respectively, of the receptacle. The latter has at its front end a scraper blade 33 which is inclined upwardly and rearwardly and extended over the forward extremity of the endless conveyer. The receptacle 15 carries adjacent to its rear end a distributing cylinder C having a hub or sleeve C′ loosely mounted on a shaft 34 which is supported for rotation, said shaft carrying slidably but non-rotatably a pinion 35 meshing with a pinion 36 which is mounted on a stub shaft 37, said stub shaft carrying also a sprocket wheel 38 which receives motion through a chain 39 from a sprocket wheel 40 associated with one of the ground wheels. The gear wheel 36 is slidable and revoluble on the stub shaft 37, and the said gear wheel and the sprocket wheel 38 are provided with interengaging clutch members 41 which may be thrown into or out of gear by means of a shipping lever 42, by means of which the slidable gear wheel may be shifted on the shaft. The pinion 35 is in like manner connected with the hub of the cylinder or beater by a clutch device 43 operable by a lever 44, thus enabling the operation of the cylinder to be interrupted at will.

It will be understood from the foregoing description and by reference to the drawing that the gear wheels or pinions 35 and 36 are of such width that the pinion 35 may be slid far enough on its supporting shaft to disengage the clutch 33 and so stop the cylinder constituting the beater, while yet retaining mesh with the pinion 36 and continuing to drive the parts 34, 45, 46, 47 and the apron, so as to operate the apron for loading while the beater is out of gear. The shaft 34 carries a bevel gear 45 meshing with a bevel pinion 46 on a shaft 47 carrying a worm 48 meshing with a worm gear 49 on the shaft 32 over which the endless conveyer 30 is guided, thus enabling said conveyer to be operated at relatively low speed.

A shaft 50 supported on the receptacle 15 is provided with arms 51 carrying obstructing teeth 52 which by proper adjustment of said shaft may be positioned in advance of the distributing cylinder. The shaft 50 has a lever 53 whereby it may be rocked when it is desired to present the teeth 52 in a non-obstructing position. The distributing cylinder is partly inclosed by a hood 54 which may be equipped with a row of teeth 55 constituting a comb for the purpose of cleaning the teeth of the cylinder C when the device is in operation.

In the operation of this device, draft may be applied to the front end of the frame 15 through the medium of a tongue 56 and an evener 57. In order to load the machine, the receptacle is lowered to a ground engaging position, as seen in Fig. 5 of the drawings, the weight of the receptacle causing it to settle down until the blade 33 will dig into the ground to the requisite depth. The cylinder C is thrown out of gear, and the machine is drawn or dragged over the ground, causing the manure to be scooped by the blade 33 and deposited on the endless conveyer 30 which is being actuated at low speed and which will gradually carry the material in a rearward direction until it is intercepted by the teeth 52, which latter are placed in obstructing position. When a load has been accumulated, the drum 21 is operated for the purpose of raising the receptacle to a proper elevation, and the load may now be conveyed to the field where it is distributed. It is obvious that during transportation to the field the operation of the endless conveyer is suspended by properly actuating the clutch 41. The teeth 52 are now moved to a non-obstructing position, and the cylinder, as well as the endless conveyer, are thrown into gear, after which, by moving the machine over the field, the load will be gradually moved by the endless conveyer in the direction of the distributing cylinder, whereby the manure is scattered and distributed in the customary manner.

Having thus described the invention, what is claimed as new, is:—

1. In a machine of the class described, a carrying frame having transporting wheels, a receptacle having a scraper blade at one end, a distributing cylinder at the other end and an intermediate endless conveyer, suitably guided flexible means supporting the front and rear ends of the receptacle for vertical adjustment with respect to the frame, means for operating the flexible means to raise and lower the receptacle, slotted guide members associated with the receptacle, studs engaging the slotted guide members to prevent longitudinal movement of the receptacle with respect to the frame, and means for transmitting motion from a transporting wheel to the conveyer and to the distributing cylinder and for interrupting such motion.

2. In a machine of the class described, a wheeled carrying frame and a receptacle supported for vertical adjustment in said frame, said receptacle having a scraper blade and conveying and distributing means, and runners under the bottom adjacent to the sides of said receptacle.

In testimony whereof I affix my signature in presence of two witnesses.

JOSEPH O. THOMPSON.

Witnesses:
 Wm. G. Bagger,
 Bennett S. Jones.

---

Copies of this patent may be obtained for five cents each, by addressing the "Commissioner of Patents, Washington, D. C."